US005431848A

United States Patent [19]

Getty

[11] Patent Number: 5,431,848

[45] Date of Patent: Jul. 11, 1995

[54] STABLE LIQUID AMIDOPEROXYACID BLEACH

[75] Inventor: Edward E. Getty, Cincinnati, Ohio

[73] Assignee: The Procter & Gamble Company, Cincinnati, Ohio

[21] Appl. No.: 205,687

[22] Filed: Mar. 3, 1994

Related U.S. Application Data

[63] Continuation of Ser. No. 656,396, Feb. 15, 1991, abandoned.

[51] Int. Cl.[6] .......................... C01B 15/10; C11D 3/395

[52] U.S. Cl. .......................... 252/186.26; 252/95

[58] Field of Search .......................... 252/106.26, 95

[56] References Cited

U.S. PATENT DOCUMENTS

| | | | |
|---|---|---|---|
| 3,996,152 | 12/1976 | Edwards et al. | 252/186.26 |
| 4,100,095 | 7/1978 | Hutchins | 252/99 |
| 4,412,934 | 11/1983 | Chung et al. | 252/186.38 |
| 4,444,674 | 4/1984 | Gray | 252/95 |
| 4,486,327 | 12/1984 | Murphy et al. | 252/94 |
| 4,536,314 | 8/1985 | Hardy et al. | 252/102 |
| 4,634,551 | 1/1987 | Burns et al. | 252/102 |
| 4,642,198 | 2/1987 | Humphreys et al. | 252/94 |
| 4,686,063 | 8/1987 | Burns | 252/102 |
| 4,767,557 | 8/1988 | Herdeman | 252/91 |
| 4,824,592 | 4/1989 | Rerek et al. | 252/95 |
| 4,828,747 | 5/1989 | Rerek et al. | 252/95 |
| 4,852,989 | 8/1989 | Burns et al. | 252/186.38 |
| 4,853,143 | 8/1989 | Hardy et al. | 252/102 |
| 4,895,669 | 1/1990 | Choy et al. | 252/95 |
| 4,909,953 | 3/1990 | Sadlowski et al. | 252/99 |
| 4,929,377 | 5/1990 | Emmons et al. | 252/95 |
| 4,981,606 | 1/1991 | Barnes | 252/95 |
| 4,997,590 | 3/1991 | Bowling | 252/186.31 |
| 5,039,447 | 8/1991 | Reuben | 252/186.26 |
| 5,049,298 | 9/1991 | Ploumen et al. | 252/95 |
| 5,055,218 | 10/1991 | Getty et al. | 252/94 |
| 5,098,598 | 3/1992 | Sankey et al. | 252/186.42 |
| 5,126,066 | 6/1992 | Torenbeek et al. | 252/95 |
| 5,302,309 | 4/1994 | Reuben | 252/95 |

FOREIGN PATENT DOCUMENTS

| | | |
|---|---|---|
| 0170386 | 2/1986 | European Pat. Off. . |
| 0176124 | 4/1986 | European Pat. Off. . |
| 240481 | 10/1987 | European Pat. Off. . |

*Primary Examiner*—Gary Geist
*Assistant Examiner*—Joseph D. Anthony
*Attorney, Agent, or Firm*—George W. Allen; Donald E. Hasse

[57] ABSTRACT

Stable liquid bleach compositions containing amidoperoxyacid bleach particles, $C_{11}$–$C_{13}$ linear alkylbenzene sulfonic acid, cumeme, toluene or xylene sulfonate, magnesium sulfate, sodium or potassium sulfate, and water combined at certain levels and ratios. The compositions have a pH of from about 3.5 to about 5 and a viscosity of from about 10 to about 1000 cps at 20° C.

11 Claims, No Drawings

STABLE LIQUID AMIDOPEROXYACID BLEACH

CROSS-REFERENCE TO RELATED APPLICATION

This is a continuation of application Ser. No. 07/656,396, filed on Feb. 15, 1991, now abandoned.

TECHNICAL FIELD

The present invention relates to stable liquid amidoperoxyacid bleach compositions useful for bleaching fabrics, hard surfaces and other substrates. The compositions contain water-insoluble aliphatic amidoperoxyacid particles, $C_{11}$–$C_{13}$ linear alkylbenzene sulfonic acid, cumeme, toluene or xylene sulfonate, magnesium sulfate, sodium or potassium sulfate, and water. The compositions also have a pH of from about 3.5 to about 5 and a viscosity of from about 10 to about 1000 cps at 20° C. The ingredients are combined at certain levels and ratios, as hereinafter described, to provide compositions exhibiting good physical, chemical and rheological stability.

BACKGROUND ART

U.S. Pat. No. 4,634,551, Burns et al, issued Jan. 6, 1987, discloses amidoperoxyacid bleaches and compositions containing them.

U.S. Pat. No. 4,686,063, Burns, issued Aug. 11, 1987, discloses boric acid as an exotherm control agent for amidoperoxyacid bleaches.

U.S. Pat. No. 4,909,953, Sadlowski et al, issued Mar. 20, 1990, discloses the use of a phosphate buffer wash for improved amidoperoxyacid stability.

European Patent Application 240,481, Boyer et al, published Oct. 7, 1987, discloses stable liquid bleaches containing diperoxyacid, preferably 1,12-diperoxydodecanedioic acid (DPDA), $C_{11}$–$C_{13}$ linear alkylbenzene sulfonate surfactant, optional cumene sulfonate, magnesium sulfate, optional sodium or potassium sulfate, and water combined at certain levels and ratios to achieve physical and chemical stability. The compositions have a pH of from about 2 to about 4.5 and a viscosity of from about 50 to about 1000 cps at 20° C.

U.S. Pat. No. 4,642,198, Humphreys et al, issued Feb. 10, 1987, discloses aqueous liquid bleaching compositions containing particulate water-insoluble peroxyacids, preferably DPDA, said to be stably suspended in an acidic surfactant-structured liquid.

U.S. Pat. No. 3,996,152, Edwards et al, issued Dec. 7, 1976, discloses stable, low-pH gels containing peroxyacid bleach particles and a non-starch thickening agent.

U.S. Pat. No. 4,100,095, Hutchins, issued Jul. 11, 1978, discloses the stabilization of peroxyacid bleaches by the use of certain exotherm control agents.

Despite the above attempts to stabilize liquid peroxyacid bleaching compositions, there is a continuing need for the development of improved liquid bleaches containing amidoperoxyacid bleach.

SUMMARY OF THE INVENTION

The present invention relates to a stable liquid bleach composition comprising, by weight:

(a) from about 7% to about 14% of an amidoperoxyacid bleach of the formula:

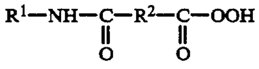 or 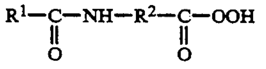

wherein $R^1$ is an alkyl group containing from about 6 to about 12 carbon atoms and $R^2$ is an alkylene group containing from 1 to about 6 carbon atoms;

(b) from about 0.3% to about 1.5% of a $C_{11}$–$C_{13}$ linear alkylbenzene sulfonic acid;

(c) from about 0.5% to about 5% of cumene, toluene or xylene sulfonate;

(d) from about 3% to about 15% of magnesium sulfate;

(e) from about 3% to about 15% of sodium or potassium sulfate; and (f) from about 60% to about 80% of water;

wherein the weight ratio of (a) to (b) is from about 7:1 to about 40:1; said composition contains from about 10% to about 20% of (d) and (e); and said composition has a pH of from about 3.5 to about 5 and a viscosity of from about 10 to about 1000 cps at 20° C.

DETAILED DESCRIPTION OF THE INVENTION

The liquid bleach compositions herein contain water-insoluble aliphatic amidoperoxyacid particles, $C_{11}$–$C_{13}$ linear alkylbenzene sulfonic acid, cumene, toluene or xylene sulfonate, magnesium sulfate, sodium or potassium sulfate, and water. These essential ingredients are combined at certain levels and ratios to obtain compositions having effective bleaching performance, low product viscosity, and good physical, chemical and rheological stability. The compositions provide better bleaching performance than granular compositions containing the same amidoperoxyacid bleach, probably because of an increased rate of dissolution of the amidoperoxyacid in the laundering solution. The present compositions generally remain as stable suspensions having little or no separation of ingredients during storage, preferably for as long as 2 months at room temperature. The compositions also have chemical (i.e., peroxyacid) stability of at least about 80%, with the preferred compositions having at least about 90%, stability after 2 months storage at room temperature. The compositions further have good rheological stability in that there is little or no thickening of product upon storage at room temperature.

The compositions of the present invention have a pH of from about 3.5 to about 5, preferably from about 4 to about 5, most preferably from about 4.25 to about 4.75, when measured at 20° C. for best peroxyacid bleach stability.

The compositions also have a viscosity of from about 10 to about 1000 cps, preferably from about 20 to about 500 cps, more preferably from about 25 to about 200 cps, and most preferably from about 30 to about 100 cps, at 20° C. when measured with an LTV Brookfield Viscometer, using a No. 3 spindle and a setting of 60 rpm. This relatively low viscosity is desired for convenient pouring from a container by the user.

The compositions of the present invention contain from about 7% to about 14%, preferably from about 8% to about 11%, more preferably from about 9% to about 10%, by weight of substantially water-insoluble particulate amidoperoxyacid bleach of the formula

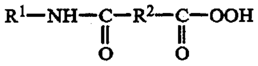
or
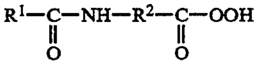

wherein $R^1$ is an alkyl group containing from about 6 to about 12 carbon atoms, and $R^2$ is an alkylene containing from 1 to about 6 carbon atoms. Preferably, $R^1$ is an alkyl group containing from about 8 to about 10 carbon atoms, and $R^2$ is an alkylene group containing from about 2 to about 4.

A preferred amidoperoxyacid herein is the monononylamide of peroxysuccinic acid ("NAPSA"). Most preferred is the monononylamide of peroxyadipic acid ("NAPAA"). Another name for NAPAA is 6-(nonylamino)-6-oxo-caproic acid. The chemical formula for NAPAA is:

The molecular weight of NAPAA is 287.4.

Example I of U.S. Pat. No. 4,686,063 contains a description of the synthesis of NAPSA, from column 8, line 40 to Column 9, line 5, and NAPAA, from column 9, line 15 to column 9, line 65. At the end of the amidoperoxyacid synthesis, the reaction is quenched with water, filtered, washed with water to remove some excess sulfuric acid (or other strong acid with which the peroxyacid was made), and filtered again.

The amidoperoxyacid wet cake thus obtained is contacted with a phosphate buffer solution at a pH between about 3.5 and 6, preferably between about 4 and 5. It has been found that if the pH of the amidoperoxyacid wet cake is raised too high, the amidoperoxyacid is dissolved, but if the pH is too low, the amidoperoxyacid is unstable. Without meaning to be bound by theory, it is believed that to stabilize the amidoperoxyacid, the strong acidity remaining from the sulfuric acid (or other strong acid) with which the peroxyacid is made must be neutralized without at the same time destroying the weak acid which is the peroxyacid. A buffer accomplishes this purpose. It has been determined that phosphate buffer, but not acetate or water washing, stabilizes the amidoperoxyacid. Since water washing to the same pH does not achieve the same effect as the phosphate buffer wash, it is theorized that some of the phosphate remains in the wet cake after contact with the phosphate buffer, which also helps storage stability. This is further borne out by the fact that phosphate buffer washing followed by water washing results in the peroxyacid having less stability than phosphate buffer washing alone.

The phosphate buffer is preferably orthophosphate or pyrophosphate in a concentration range of from about 0.01M (moles/liter) to about 1M. Most preferred is a 0.10M solution of orthophosphates. These can be selected from the group consisting of $H_3PO_4$ (phosphoric acid), $NaH_2PO_4$ (monobasic sodium phosphate), $Na_2HPO_4$ (dibasic sodium phosphate), and $Na_3PO_4$ (tribasic sodium phosphate), so that the final solution has a pH of between about 3.5 and 6, preferably between about 4 and 5. Other salts such as potassium can be employed. Examples of phosphate buffer solution compositions can be found in *Buffers for pH and Metal Ion Control* by D. D. Perrin and Boyd Dempsey (Chapman & Hall, 1974).

There are several ways that the amidoperoxyacid can be contacted with the phosphate buffer solution. Preferably, the amidoperoxyacid wet cake is placed in enough of the phosphate buffer to cover it, and the combination is slowly stirred for a period of time sufficient to assure thorough contact with the wet cake. Approximately one hour for 20.0 g of wet cake in 400 ml of phosphate buffer (0.10M, pH=4.75), for example, is an appropriate amount of time. Suction filtration is then preferably applied to remove the solution. The wet cake can then be air dried overnight. Conceivably, less phosphate buffer solution of a stronger concentration could be used. A 0.1M phosphate buffer solution is preferred since it provides more volume and, when mixed with the wet cake, thorough contact and easier stirring than, for example, a 0.5M solution.

Another preferred way of contacting the wet cake with the buffer is to pour the buffer over the wet cake and then apply vacuum filtration. In a plant, the filtered wet cake could be placed on a fluid bed for final drying before it is incorporated into the final bleaching composition.

The phosphate buffer wash should be done before the amidoperoxyacid has decomposed. The product has decomposed when there is so little amidoperoxyacid remaining that it is no longer an effective bleach. The activity of the amidoperoxyacid can be measured by the available oxygen. Generally, the higher the AvO is, the better the peroxyacid will bleach.

Other agents for storage stabilization or exotherm control can be added to the amidoperoxyacid before incorporation into the final product. For example, boric acid, an exotherm control agent disclosed in U.S. Pat. No. 4,686,063, Burns, issued Aug. 11, 1987 and incorporated herein, can be mixed with the amidoperoxyacid (which has been washed in phosphate buffer) in about a 2:1 peracid:boric acid ratio. The phosphate buffer washed amidoperoxyacid can also be mixed with appropriate amounts of dipicolinic acid and tetrasodium pyrophosphate, a chelating stabilization system.

Chelants can optionally be included in the phosphate buffer before contact with the wet cake. Without wishing to be bound by theory, it is believed that adding the chelants in this way improves their effectiveness by more evenly distributing the chelants throughout the wet cake.

Examples of suitable chelants for use herein are: carboxylates, such as ethylene diamine tetraacetate (EDTA) and diethylene triamine pentaacetate (DTPA); polyphosphates, such as sodium acid pyrophosphate (SAPP), tetrasodium pyrophosphate (TSPP), and sodium tripolyphosphate (STPP); phosphonates, such as ethylhydroxydiphosphonate (Dequest® 2010) and other sequestering agents sold under the Dequest® trade name; and combinations of the above. Other sequestering agents for use herein are dipicolinic acid, picolinic acid, and 8-hydroxyquinoline, and combinations thereof.

The phosphate buffer washed amidoperoxyacid can contain from 0 to about 10% of a chelating agent, preferably from about 0.01% to about 1% by weight.

NAPAA can be prepared by, for example, first reacting NAAA (monononyl amide of adipic acid), sulfuric acid, and hydrogen peroxide. The reaction product is quenched by addition to ice water followed by filtration, washing with distilled water, and final suction filtration to recover the wet cake. Washing can be continued until the pH of the filtrate is neutral.

Small particle size NAPAA agglomerates are desired herein to increase the amount of effective bleach which is in the wash solution and thereby improve bleaching/-cleaning of fabrics in the wash. This is particularly useful in a hard water wash, i.e. wash water with more than about 6 grains of hardness, because hardness, specifically calcium ions, has been seen to interfere with available oxygen (AvO) from NAPAA with larger particle size. While not meaning to be bound by theory, it is believed that the calcium ions in the hard water surround large NAPAA particles, i.e. greater than about 300 microns, and interfere with the dissolution of the NAPAA, and that the smaller (about 0.1–260 microns) NAPAA particles dissolve rapidly in the wash water with minimal interference from the hardness ions. Small NAPAA particles are preferably recovered by quenching in water with high shear applied, e.g. rapid stirring, during addition of the NAPAA solution to water. Other known means of achieving small particle size may be used as appropriate. The NAPAA is then rinsed with water to remove excess sulfuric acid. The average particle size of the NAPAA herein is 0.1 to 260 microns and is in large part a function of the amount of shear applied. Even better solubility in harder water can be achieved, though, with a NAPAA average particle size of between about 1 and 160 microns. The average particle size is preferably from about 5 to 100 microns, and most preferably from about 5 to about 40 microns. It is believed that the present smaller particle size would improve NAPAA solubility in most aqueous applications in addition to a laundry application.

NAPAA filter cake herein is preferably washed twice in phosphate buffer. It has been found that two successive phosphate buffer washes lend optimal stability to NAPAA. It is also highly preferred that the NAPAA pH (10% solids in water) be between about 4.2 and 4.75. Surprisingly, this pH results in more thermally stable particles.

The compositions contain from about 0.3% to about 1.5%, preferably from about 0.5% to about 1%, by weight of a $C_{11}$–$C_{13}$ linear alkylbenzene sulfonic acid. This ingredient contributes to physical stability by dispersing the peroxyacid particles. Lower levels of alkylbenzene sulfonic acid do not adequately disperse the peroxyacid particles, whereas higher levels tend to dissolve them and undesirably thicken the composition upon storage. Thus, the type and level of alkylbenzene sulfonic acid must be selected along with the other ingredients herein to provide the desired stability and viscosity. The $C_{12-13}$ alkylbenzene sulfonic acids are particularly preferred.

The compositions can also contain from 0.5% to about 5%, preferably from about 1% to about 4%, most preferably from about 1.5% to about 3%, by weight of a water-soluble (e.g., alkali metal, ammonium or alkylolammonium) cumene, toluene or xylene sulfonate. These hydrotropes function to aid dispersion and suspension of the amidoperoxyacid particles in the aqueous phase.

The bleach compositions herein further contain from about 3% to about 15%, preferably from about 5% to about 12%, more preferably from about 6% to about 9%, by weight, of magnesium sulfate, which is commercially available in the heptahydrate form. (If anhydrous magnesium sulfate is used, the above levels should be adjusted accordingly.) It is believed that magnesium sulfate chemically stabilizes the amidoperoxyacid by forming a magnesium salt thereof which is more soluble in the aqueous phase and more stable than the corresponding peracid. It is also believed that the magnesium sulfate improves phase stability by helping to suspend the amidoperoxyacid particles via density matching. Magnesium sulfate also functions as an effective exotherm control agent should the present compositions convert to a dry state.

The compositions further contain from 3% to about 15%, preferably from about 5% to about 12%, more preferably from about 6% to about 9%, by weight, of sodium sulfate or potassium sulfate. Sodium and potassium sulfate are used to help match the density of, and thereby suspend, the peroxyacid particles. Mixtures of sodium or potassium sulfate and magnesium sulfate avoid adding excessive magnesium hardness to the wash water. The mixture of these salts also appears to be more effective at physically stabilizing the peroxyacid particles.

Finally, the compositions contain from about 60% to about 80%, preferably from about 65% to about 75%, by weight, of water.

The magnesium sulfate and sodium or potassium sulfate should represent from about 10% to about 20%, preferably from about 12% to about 17%, by weight of the composition in order to adequately suspend the peroxyacid particles. The weight ratio of magnesium sulfate to sodium or potassium sulfate is preferably from about 2:1 to about 1:2, more preferably from about 1.5:1 to about 1:1.5, for the desired combination of exotherm stability, low wash water hardness, and low viscosity.

The weight ratio of amidoperoxyacid particles to $C_{11}$–$C_{13}$ alkylbenzene sulfonic acid should also be from about 7:1 to about 40:1, preferably from about 8:1 to about 16:1, to provide sufficient alkylbenzene sulfonic acid to disperse the amidoperoxyacid particles without significantly dissolving them or thickening the composition.

The bleaching compositions of the present invention can, of course, be employed by themselves as bleaching agents. The compositions can also be used as one element of a total bleaching or cleaning composition, and commonly will be used in conjunction with a separate cleaning composition, such as a laundry detergent composition separately added to the laundering solution.

Bleaching compositions herein can contain any of the optional ingredients known for use in such compositions.

The compositions herein can contain minor amounts, generally less than about 1%, preferably less than about 0.5%, most preferably less than about 0.25%, by weight of other synthetic surfactants, such as other anionic, nonionic, cationic and zwitterionic surfactants, or mixtures thereof, known in the art. However, such additional surfactants, particularly nonionic and cationic surfactants, are believed to increase viscosity and to cause phase separation when used at higher levels, and thus are not preferred for use herein. Preferably, the compositions are substantially free of such other surfactants.

Since the peroxyacid compounds used in the compositions of the present invention are subject to the loss of available oxygen when contacted by heavy metals, it is desirable to include a chelating agent in the compositions. Such agents are preferably present in an amount ranging from 0,005% to about 1.0%, preferably from about 0.05% to about 0.5% by weight of the composition. The chelating agent can be any of those described above or described in U.S. Pat. No. 3,442,937, issued May 6, 1969 to Sennewald et al., U.S. Pat. No. 2,838,459, issued Jul. 10, 1958 to Sprout, Jr., and U.S. Pat. No. 3,192,255, issued Jun. 29, 1965 to Cann, incorporated herein by reference. Preferred chelating agents are picolinic acid, dipicolinic acid, and ethylhydroxydiphosphonate.

The compositions preferably also contain minor amounts, e.g., about 0.25% to about 3%, preferably from about 0.5% to about 2%, of a polymeric stabilizer to inhibit thickening over time and to enhance stability under stress storage conditions, such as freezing and thawing. Polymers useful herein are disclosed in European Patent Application 347,988, published Dec. 27, 1989, incorporated herein by reference. A particularly preferred polymer is polyvinylpyrrolidone having a molecular weight of about 10,000.

Bleaching compositions of the present invention are utilized by adding them to water in an amount sufficient to provide from about 1 ppm to 100 ppm, preferably from about 1 ppm to 20 ppm, available oxygen in solution. Generally, this amounts to about 0.01% to 0.4% by weight of composition in solution. Fabrics to be bleached are then contacted with such aqueous bleaching solutions.

The compositions of the present invention can also be used in cojunction with conventional fabric laundering detergent compositions. Such compositions can contain standard detergent ingredients, such as the surfactants and builders described in U.S. Pat. No. 4,100,095, Hutchins et al., issued Jul. 11, 1978, incorporated herein by reference. Other detergent compositions that can be used with the compositions herein are described in U.S. Pat. No. 4,561,998, Wertz, et al., issued Dec. 31, 1985, U.S. Pat. No. 4,507,219, Hughes, issued Mar. 26, 1985, and U.S. Pat. No. 4,909,953, Sadlowski et al, issued Mar. 20, 1990, all incorporated herein by reference.

The following examples illustrate the compositions of the present invention.

All parts, percentages and ratios used herein are by weight unless otherwise specified.

EXAMPLE I

A freshly-prepared sample of NAPAA wet cake, which typically consists of about 60% water, about 2% peroxyacid available oxygen (AvO) (corresponding to about 36% NAPAA), and the rest (about 4%) unreacted starting material, is obtained. This wet cake is the crude reaction product of NAAA (mononony1 amide of adipic acid), sulfuric acid, and hydrogen peroxide which is subsequently quenched by addition to water followed by filtration, washing with distilled water, phosphate buffer washing and final suction filtration to recover the wet cake. A portion of the wet cake is air-dried at room temperature to obtain a dry sample which typically consists of about 5% AvO (corresponding about to 90% NAPAA) and about 10% unreacted starting material. When dry, the sample pH is about 4.5. The average amide peroxyacid particle (agglomerate) size is about 90–100 microns and the median particle size is about 40–50 microns, as determined by Malvern particle size analysis.

The following composition is prepared by high speed mixing (Lightnin mixer) of the NAPAA wet cake (39.66% active) into the water followed by high shear mixing (Silverson L4R Homogenizer) of the NAPAA, water and linear alkylbenzene sulfonic acid. The NAPAA and water are added to the mixing vessel (4L beaker) before turning on the mixer. The other components are added in the order listed at the indicated times (approximate) after turning on the mixer.

| Component | Grams | Finished Product wt.% | Time |
|---|---|---|---|
| Nonylamide of peroxyadipic acid (Added as wet cake, 39.66% active*) | 513.9 | 10.19 | 0 min |
| Water (additional) | 643.2 | Balance to 100** | 0 min. |
| $C_{12.3}$ linear alkylbenzene sulfonic acid (96% active*) | 29.6 | 1.42 | 5 min. |
| Sodium toluene sulfonate (93% active) | 34.6 | 1.61 | 30 min. |
| Dequest ® 2010 (ethylhydroxy diphosponate) (60% active*) | 1.0 | 0.06 | 31 min. |
| Sodium sulfate (99.7% active) | 140.4 | 7.00 | 32 min. |
| Magnesium sulfate heptahydrate | 125.3 | 6.25 | 33 min. |
| Sodium hydroxide (1.61% active*) | 310.0 | 0.25 | 50 min. |

*Balance primarily water.
**Includes minors such as unreacted NAAA

After 45 minutes, the pH of the composition is determined to be 2.3 at 20° C. The sodium hydroxide is added after 50 minutes to adjust the pH to 4.5 at 20°. After 60 minutes, the pH is again determined to be 4.5. The sides of the beaker are washed with 200 grams of water and the mixer is turned off. The composition is a stable suspension of ingredients having a viscosity of from about 30 to about 100 cps at 20° C. The NAPAA particles have an average particle size of about 20 microns.

The above describes the preferred process for making the composition since high shear mixing of the NAPAA has been found to be important to obtain the desired physical stability.

After making, a sample of the composition is removed, analyzed, and found to contain 9.84% NAPAA. Since the target is 10.19% NAPAA, a small loss apparently occurred during the making process.

Samples of the composition are placed in storage at 30° F. (−1.1° C.), 40° F. (4.4° C.), 50° F. (10° C.), 60° F. (15.6° C.), 70° F. (21.1° C.), 80° F. (26.6° C.), 90° F. (32.2° C.), 100° F. (37.8° C.), 120° F. (48.9° C.). After 14 days, the samples have very good physical and chemical stability, as indicated below.

Physical Stability

30° F.—Less than about 10% clear aqueous layer on top.
40° F.—Less than about 10% clear aqueous layer on top.
50° F.—No separation.
60° F.—Less than about 2% clear aqueous layer on bottom.
70° F.—Less than about 2% clear aqueous layer on bottom.
80° F.—Less than about 2% clear aqueous layer on bottom.
90° F.—No separation.
100° F.—No separation.
120° F.—Less than about 20% clear aqueous layer on top and less than about 10% clear aqueous layer on bottom.

Chemical Stability

80° F.—9.61% NAPAA
90° F.—9.60% NAPAA
100° F.—9.48% NAPAA

The above liquid bleach composition is designed for a usage level of about ⅛ cup (i.e., about 30 ml) in a typical U.S. laundering process, and delivers about 5 ppm AvO to the wash water.

EXAMPLE II

Other compositions of the present invention, which can be prepared as in Example I, are as follows:

| | Wt. % | | | | | |
|---|---|---|---|---|---|---|
| Components | A | B | C | D | E | F |
| Nonyl amide of peroxyadipic acid* | 10.19 | 11.42 | 10.19 | 10.19 | 8.48 | 10.19 |
| $C_{12.3}$ linear alkylbenzene sulfonic acid | 1.00 | 0.30 | 1.00 | 1.00 | 1.00 | 1.00 |
| Sodium toluene sulfonate | 1.61 | 1.61 | 1.61 | 1.61 | 1.61 | 1.61 |
| Dequest 2010 | 0.12 | 0.15 | — | 0.06 | 0.06 | 0.06 |
| Dipicolinic acid | — | — | 0.10 | — | — | — |
| Sodium sulfate | 7.00 | 7.00 | 7.00 | 3.50 | 7.00 | 3.50 |
| Magnesium sulfate heptahydrate | 6.25 | 6.25 | 6.25 | 6.25 | 6.25 | 12.50 |
| Sodium hydroxide | 0.25 | 0.25 | 0.25 | 0.25 | 0.25 | 0.25 |
| PVP (10,000 m.wt.) | — | — | — | — | 1.00 | — |
| Brightener | — | — | — | — | 0.01 | — |
| Water & minors | Balance to 100 | | | | | |

*Average particle size about 20 microns, after preparation.

The above compositions are stable suspensions having viscosities within the range of 25 to 200 cps at 20° C. The compositions have pHs of about 4.5 at 20° C.

Other compositions of the present invention are obtained when in the above compositions the bleach is the nonyl amide of peroxysuccinic acid instead of the nonyl amide of peroxyadipic acid.

What is claimed is:

1. A stable liquid bleach composition comprising, by weight:
   (a) from about 7% to about 14% of an amidoperoxyacid bleach wherein the amidoperoxyacid bleach is the nonylamide of peroxyadipic acid;
   (b) from about 0.3% to about 1.00% of a $C_{11}$-$C_{13}$ linear alkylbenzene sulfonic acid;
   (c) from about 0.5% to about 5% of cumene, toluene or xylene sulfonate;
   (d) from about 3% to about 15% of magnesium sulfate;
   (e) from about 3% to about 15% of sodium or potassium sulfate; and
   (f) from about 60% to about 80% of water;

wherein the weight ratio of (a) to (b) is from about 7:1 to about 40:1; said composition contains from about 10% to about 20% of (d) and (e); and said composition has a pH of from about 3.5 to about 5 and a viscosity of from about 10 to about 1000 cps at 20° C.

2. A composition according to claim 1 wherein the amidoperoxyacid bleach has an average particle size of from about 5 to about 40 microns.

3. The composition of claim 1 wherein (b) is a $C_{12-13}$ linear alkylbenzene sulfonic acid.

4. The composition of claim 1 wherein the composition has a viscosity of from about 30 to about 100 cps at 20° C.

5. The composition of claim 1 having a pH of from about 4.25 to about 4.75 at 20° C.

6. The composition of claim 5 comprising from about 65% to about 75% of water 7. The composition of claim 6 comprising from about 9% to abut 10% of NAPAA.

8. A stable liquid bleach composition comprising, by weight:
   (a) from about 7% to about 14% of particles of a nonylamide of peroxyadipic acid bleaching agent, said particles ranging in size from about 5 to 40 microns;
   (b) from about 0.3% to about 1.0% of a $C_{11}$-$C_{13}$ linear alkylbenzene sulfonic acid;
   (c) from about 0.5% to about 5% of cumene, toluene or xylene sulfonate;
   (d) from about 3% to about 15% of magnesium sulfate;
   (e) from about 3% to 15% of sodium or potassium sulfate; and
   (f) from about 60% to about 80% of water;

wherein the weight ratio of (a) to (b) is from about 14:1 to 40:1; wherein said composition contains from about 10% to about 20% of (d) and (e); and wherein said composition has a pH of from about 3.5 to 5 and a viscosity of from about 10 to about 1000 cps at 20° C.

9. The composition of claim 8 having a pH of from about 4.25 to 4.75 at 20° C.

10. The composition of claim 9 comprising from about 65% to about 75% of water.

11. The composition of claim 10 comprising from about 9% to 10% of the bleaching agent particles.

* * * * *